ized: US 9,155,319 B1

United States Patent
Perlman (10) Patent No.: US 9,155,319 B1
(45) Date of Patent: Oct. 13, 2015

(54) TRUNCATED GAUSSIAN DISTRIBUTION OF COFFEE PARTICLES, CARTRIDGE ASSEMBLIES, AND USES THEREOF

(71) Applicant: Brandeis University, Waltham, MA (US)

(72) Inventor: Daniel Perlman, Arlington, MA (US)

(73) Assignee: Brandeis University, Waltham, MA (US)

( * ) Notice: Subject to any disclaimer, the term of this patent is extended or adjusted under 35 U.S.C. 154(b) by 0 days.

(21) Appl. No.: 14/459,613

(22) Filed: Aug. 14, 2014

(51) Int. Cl.
*A23F 5/08* (2006.01)
*B65D 85/804* (2006.01)
*A23F 5/26* (2006.01)

(52) U.S. Cl.
CPC . *A23F 5/08* (2013.01); *A23F 5/262* (2013.01); *B65D 85/8043* (2013.01)

(58) Field of Classification Search
CPC . A47J 31/0668; A47J 31/002; A47J 31/3623; A23F 5/00; A23F 5/26; A23F 5/267
See application file for complete search history.

(56) References Cited

U.S. PATENT DOCUMENTS

| | | | |
|---|---|---|---|
| 4,187,324 A | 2/1980 | Shirbroun | |
| 4,267,200 A | 5/1981 | Klien et al. | |
| 4,331,696 A | 5/1982 | Bruce, III | |
| 4,591,508 A | 5/1986 | Pultinas, Jr. | |
| 4,594,256 A | 6/1986 | Zemelman et al. | |
| 4,594,257 A | 6/1986 | Leblanc et al. | |
| 5,064,676 A | 11/1991 | Gore | |
| 5,082,676 A * | 1/1992 | Love | B65D 85/8043 426/112 |
| 5,325,765 A | 7/1994 | Sylvan et al. | |
| 5,433,962 A | 7/1995 | Stipp | |
| 5,725,898 A | 3/1998 | Murphy et al. | |
| 5,741,538 A | 4/1998 | Stipp et al. | |
| 5,783,246 A | 7/1998 | Wong et al. | |
| 5,853,788 A | 12/1998 | Murphy et al. | |
| 5,922,385 A | 7/1999 | Stipp et al. | |
| 6,142,063 A | 11/2000 | Beaulieu et al. | |
| 6,672,200 B2 | 1/2004 | Duffy et al. | |
| 2005/0183578 A1* | 8/2005 | Mandralis | A47J 31/0673 99/279 |

OTHER PUBLICATIONS

Repanich J., "Single-Serve Coffeemaker Showdown: 8 Brewers Put to the Test," Popular Mechanics, retrieved at http://www.popularmechanics.com/technology/gadgets/reviews/single-serve-coffeemaker-showd, on Jul. 14, 2014, 7 pages.
KitchenBoy, "Single Serve Coffee Machine Primer," retrieved at http://kitchenboy.net/blog/single-serve-coffee-machine-primer/, on Jul. 14, 2014, 12 pages.
"A Truly Refreshing Offer!," Keurig Single cup Coffee & Brewers, retrieved at http://www.keurig.com, on Jul. 14, 2014, 2 pages.
Prince, M., "Baratza Grinders," Baratza Grinders Technical Paper, retrieved at http://www.coffeegeek.com/pdfs/Baratza%20Grinders%20%20SM.pdf, on Jul. 14, 2014, 18 pages.
Coffeechemistry.com, "Grinding Fundamentals," retrieved at http://www.coffeechemistry.com/grinding/grinding-fundamentals.html, 8 pages, on Jul. 14, 2014.
RapidCoffee, "Titan Grinder Project: Particle Size Distributions of Ground Coffee," retrieved at http://www.home-barista.com/reviews/titan-grinder-project-particle-size-distributions-of-ground-coffee-t4203.html (Jun. 7, 2007), 9 pages.
"Solofill K3 Chrome," Solofill Cup, Reusable K-Cup, Refillable K-Cup for Keurig Brewers, retrieved at http://www.solofill.com/, on Jul. 14, 2014, 3 pages.

* cited by examiner

Primary Examiner — Anthony Weier
(74) Attorney, Agent, or Firm — LeClairRyan, a Professional Corporation (57) ABSTRACT

The present technology relates to compositions, assemblies, and methods for the brewing of ground coffee bean particles, where the ground coffee bean particles have been separated on the basis of size to provide a truncated Gaussian distribution of particle sizes of coffee particles.

30 Claims, 2 Drawing Sheets

TRUNCATED GAUSSIAN DISTRIBUTION OF COFFEE PARTICLES, CARTRIDGE ASSEMBLIES, AND USES THEREOF

FIELD OF THE TECHNOLOGY

This technology relates to compositions, systems, and methods for the brewing of ground coffee bean particles. The compositions include ground and sized coffee bean particles that have been separated on the basis of size to provide a truncated Gaussian distribution of particle sizes of coffee particles. The coffee bean particles may be packaged and sealed inside a coffee filter cartridge assembly configured and arranged for use in compatible, i.e., companion, automated coffee brewing machines.

BACKGROUND

Historically, ground roasted coffee beans have been brewed with hot water by any one variety of at least four different methods. Depending upon how the water is combined with the ground coffee, these methods and common names associated with the methods include (i) boiling and decoction, e.g. cowboy coffee, (ii) steeping or infusion, e.g., French press coffee, (iii) gravitational filtration, e.g., drip and percolator coffees, and (iv) pressurized filtration, e.g., espresso coffee. Each of these methods includes variations and, for producing an acceptable to good tasting coffee beverage, requires coffee beans ground to different average particle sizes. For example, boiled cowboy coffee utilizes coarse grounds (approximately 1 mm or greater diameter) where the grounds settle rapidly to the bottom of the pot. Boiled Turkish or mud coffee in the Middle East utilizes a finely ground coffee (less than 0.4 mm diameter) that is brought to a rapid boil with or without sugar one or more times and allowed to settle slowly to the bottom of the pot. Steeped French press coffee also utilizes a coarse ground coffee (1-1.5 mm diameter) in which a tall cylinder fitted with a metal and/or nylon mesh filter-plunger is used to move suspended coffee grounds to the bottom of the cylinder, enabling the filtered coffee to be poured out for drinking. Gravity filtration brewing methods include the drip process in which the coffee particles rest in an open filter with a filter support holder, and are typically bathed with hot water that is manually or automatically dispensed onto the coffee grounds for a few minutes before the coffee is poured. The filtration and percolator methods utilize a regular grind (approximately 1 mm diameter) or drip grind (approximately 0.75 mm diameter). With percolator brewing, boiling water is forced upward into a brewing chamber where, like drip brewing, simple gravity moves the water downward through the grounds. Unlike the drip method, percolator brewing passes the water upward and then downward over the grounds repeatedly. By contrast, classical pressurized filtration methods exemplified by the espresso and "moka pot" methods rely on highly pressurized hot water that is forced upward or downward a single time, through finely ground coffee grounds (approximately 200 microns or 0.2 mm diameter). While a moka pot may generate only about 1 bar (14-15 psi) of pressure, an espresso machine generally operates at ten times that pressure, forcing heated water at approximately 200° F. through a packed bed or "puck" of coffee grounds to produce between 1 and 2 ounces of highly concentrated coffee.

General information on matching approximate coffee particle size to the coffee brewing method being used is available. A certain amount of information can found on the web at for example: http://www.coffeegeek.com/pdfs/Baratza%20Grinders%20%20SM.pdf and http://www.coffeechemistry.com/grinding/grinding-fundamentals.html. The latter reference cites T. Lingle, "The Coffee Brewing Handbook", Specialty Coffee Association of America (1996) for information on coffee particle size. These references are all in agreement, indicating that the typical coffee particle size for French press grind ranges up to approximately 1.3 mm, while coffee "regular grind" should average approximately 1.0 mm, drip grind approximately 0.7-0.8 mm, fine grind approximately 0.3-0.4 mm, and espresso grind 0.2-0.25 mm (200-250 microns).

Over the past twenty years, inventors at the Keurig Corporation have been awarded approximately 30 patents relating to (i) disposable beverage filter cartridges configured and adapted to store and subsequently brew ground coffee or tea particles, and (ii) automatic brewing machines designed to accommodate these filter cartridges and deliver individual servings of freshly brewed hot beverages. The filter cartridges are generally sized to provide single servings, and the machines are designed to deliver predetermined amounts of low pressure heated water, e.g., between 4 and 12 ounces of water at a temperature of approximately 192° F. Duffy et al. in U.S. Pat. No. 6,672,200 describes in considerable detail the controlled operation of a typical automated Keurig-type beverage brewing system. One of the control systems employs sensors that control and limit air pressure delivering heated water through a brewing cartridge (holding coffee grounds or tea leaves, for example) to a range of between approximately 1.5 and 7 psi (between 0.1 atm and 0.5 atm or bar of pressure). Sylvan et al. describes an improved beverage filter cartridge in U.S. Pat. No. 5,325,765 for use in an automatic brewing machine. Such brewing machines that are adapted to hold disposable filter cartridges are described in a number of other patents assigned to Keurig, Inc., such as U.S. Pat. No. 6,142,063 by Beaulieu et al. The filter cartridge of Sylvan et al. is small and compact, yet allows a high water flow rate. Aiding in achieving their objectives, a highly permeable coffee filter is provided. The filter can be formed from a synthetic non-woven and water-permeable material such as polypropylene or polycarbonate fibers, selected to be strong and self-supporting when wet. The cartridge is generally hermetically sealed above and optionally below the dry coffee or tea held in the filter so as to preserve product freshness. At the time of use, the upper cartridge sealing membrane (and lower sealing membrane, if present) are typically punctured by a sharp and rigid hollow tube device as the lid of the brewing machine is closed. The hollow tube delivers low-pressure hot water that subsequently enters and exits the cartridge. A gasket positioned around the water injection tube contacts the cartridge's upper sealing membrane to establish a pressure seal. This seal allows adequate water pressure, e.g., between 0.1 and 0.5 bar, to be maintained over and through the bed of coffee grounds and support filter to push the coffee beverage out of the cartridge.

Many patents have been directed to the design of single use coffee filter cartridges and accompanying automatic brewing machines. However, the literature is lacking a description of the engineering and tailoring of coffee grounds for use in single serving coffee filter cartridges. There is little information available on suitable coffee particle size for use in single serving filter cartridges that are brewed in coffee machines such as Keurig's B70 Platinum single cup brewing system (Keurig Corporation, Reading, Mass.). This method of brewing coffee required development of single serving filter cartridges containing ground coffee (U.S. Pat. No. 5,325,765 by Sylvan et al.) and an accompanying automatic brewing machine (U.S. Pat. No. 6,142,063 by Beaulieu et al.). To the extent that the filter cartridge brewing process has both similarities and differences from the drip and the espresso methods, it is difficult to predict what size of coffee particle is suitable for filter cartridge coffee brewing.

The present technology is directed to overcoming these and other deficiencies in the art.

SUMMARY

This technology relates to a coffee bean composition. The composition includes ground and sized coffee bean particles having an upper size-limited, truncated Gaussian distribution of particle sizes.

This technology also relates to a filter cartridge assembly containing ground and sized coffee bean particles, wherein the ground and sized coffee bean particles have an upper size-limited, truncated Gaussian distribution of particle sizes. The filter cartridge assembly is configured for brewing in an automated coffee brewing machine.

This technology further relates to a method of brewing a coffee beverage. The method involves providing a filter cartridge assembly containing ground and sized coffee bean particles having an upper size-limited, truncated Gaussian distribution of particle sizes, positioning the filter cartridge assembly in a brewing machine, and brewing the ground coffee bean particles to produce a coffee beverage.

Figure 2:
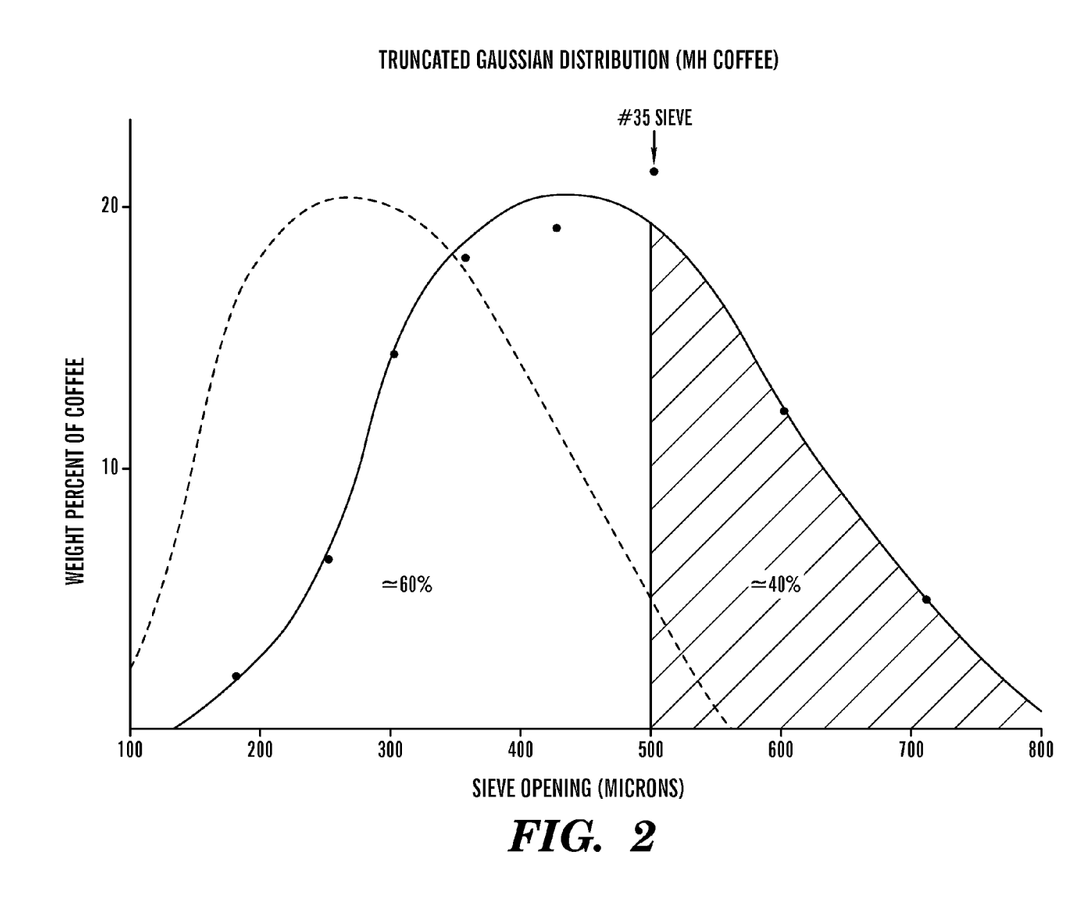
FIG. 2 shows a Gaussian distribution of coffee particle sizes generated from a sieving analysis of Maxwell House "Breakfast Blend" (continuous line). The shaded portion of the distribution curve represents coffee particles larger than 500 microns that have been removed from the balance of the coffee by sieving. The dashed line curve shows a theoretical Gaussian distribution having a similar width and size heterogeneity to the test curve, where the distribution would be similarly substantially free of particles larger than 500 microns.

This technology relates to ground coffee particles produced from coffee beans, in which the particles are suited for use in any brewing assembly or technique in which maximum extraction of coffee constituents (e.g., flavor, caffeine, antioxidants) and flow rate is desired. In one embodiment, the ground coffee particle composition is used for brewing in coffee filter cartridges (also known as coffee "filter pods" and "K-cups"). Such filter cartridges can be placed in automatic brewing machines that supply low-pressure heated water for brewing coffee and tea beverages and other drinks including hot chocolate. In the present technology, size-separated and selected ground coffee bean particles are placed in a brewing machine, and heated water is passed through a bed of the particles to produce a beverage. The size-separated coffee particles of the present technology can be obtained by fractionating, e.g., size-sieving, a heterogeneous and generally Gaussian distribution of particle sizes (produced during coffee bean grinding) to remove the uppermost range of particle sizes. Coffee bean particles that are ground to a suitable weight average particle size for brewing in filter cartridges with the brewing machines described herein originally include a substantial percentage of particles larger than 600 microns, 650 microns, or even 700 microns. These large particles are less useful than smaller particles because they release extractable constituents from the coffee bean (e.g., flavor, caffeine, antioxidants) more slowly than small particles. In the present technology, the larger particles are removed from a heterogeneous population of particle sizes to enable the brewing of stronger coffee, gram for gram. In removing the larger particles, the peak particle size in the coffee particle population remains the same while only the upper end of the generally Gaussian distribution of particle sizes is truncated, i.e., removed (see FIG. 2 in which particles larger than 500 microns are removed). This is important because the remaining particles are ideally sized for effective brewing with heated water at low pressure (a necessary condition of certain brewing methods). By contrast, fine-grinding of coffee beans to a smaller average particle size as illustrated in FIG. 2 has been found unworkable given existing filter cartridges and the low pressure of heated water in certain automatic coffee machines. More specifically, if smaller particles are placed in a filter cartridge, as the brewing process proceeds, the rate of coffee flow from the cartridge rapidly slows or even ceases.

In the present technology, the unique mechanics of coffee brewing in filter cartridges and the dynamics of extracting flavor and soluble bioactive ingredients from coffee particles in these filter cartridges is described. These mechanics and dynamics differ markedly from various other methods of coffee brewing. Empirical research has helped determine what parameters should determine the size distribution in a population of coffee particles selected for use in filter cartridges. In particular, in order to achieve efficient extraction of coffee bean constituents ("extractables") including flavor, color, caffeine and antioxidants, it has been determined that coffee particles within a filter cartridge should have a novel distribution of particle sizes. If, for example, the largest ⅓ by weight of particles is removed and replaced with the same amount of smaller particles, a substantial increase in coffee beverage strength can be achieved. During typical filter cartridge brewing of coffee, it has been shown herein that, gram for gram, the largest ⅓ of the coffee particles release as little as half the level of extractables released by smaller particles. Replacing this ⅓ portion of particles by smaller particles that release twice the level of extractables can increase the total yield of extractables in a coffee beverage by approximately ⅙. For filter cartridges containing 12 g of coffee particles, this replacement allows approximately a 2 g reduction in coffee loading per cartridge without any significant decrease in coffee beverage strength.

DETAILED DESCRIPTION

This technology relates to a coffee bean composition. The composition includes ground and sized coffee bean particles having an upper size-limited, truncated Gaussian distribution of particle sizes.

The term "particle size" refers to ground coffee bean particles that have diverse and irregular shapes and widely varying sizes depending upon the coffee bean grinding method and machine settings. Particle size is defined and determined herein by the physical size of coffee particles as measured by particle retention or passage on calibrated sieves that have measured mesh size openings, where a particle will either pass through (and therefore be smaller than) or be retained by (and therefore larger than) a certain sieve whose size openings are measured and known. Coffee particle sizes are defined to be within a certain size range (aka, "size window") determined by a particle's ability to pass through one sieve with larger mesh openings or 'holes' and not pass through a second sieve with smaller mesh openings. For example, coffee particles passing through a U.S. Standard No. 30 sieve but not through a No. 35 sieve are smaller than 600 microns but larger than 500 microns while coffee particles passing through a U.S. Standard No. 35 sieve but not passing through a No. 40 sieve are smaller than 500 microns but larger than 425 microns. A "weight average particle size" can be assigned to such particles as described below. For purposes of approximation, that weight average size is the arithmetic average or mean between the two sieve size openings, i.e., for these 500 and 425 micron openings, a value of approximately 463 microns is assigned.

In the present technology, coffee particles are tested for their sizes using U.S. Standard particle sizing sieves. Sieves are orbitally shaken and impacted (tapped approximately once per second to facilitate passage of particles) for an interval of at least 15 minutes on a sieve shaker machine.

The term "sized" as used herein refers to particles which have been separated (or fractionated) on the basis of size using any suitable method.

The term "Gaussian distribution" as used herein refers to a distribution generally having the shape of a normal curve or a normal distribution, sometimes referred to as a "bell curve," with a finite mean and variance. As used herein, a Gaussian distribution does not need to exhibit a perfect bell-shaped curve and the height and width can vary. As used herein, the Gaussian distribution can also be skewed (for example, positively or negatively) to result in an asymmetric distribution. As described in detail infra, a skewed Gaussian distribution of ground coffee bean particles can be obtained when, for example, large particles are removed, re-ground to smaller particle sizes, and added back to the ground coffee bean composition.

The term "weight average particle size" and its "size distribution" as used herein is determined with respect to calibrated reference sieve sizes as described herein. Weight average determinations by sieving herein are determined relative to pairs of neighboring sieve size openings. A sieve opening is the measured distance separating adjacent strands in a sieve wire mesh. For the purposes of definition and approximation herein, a group of particles passing through a first calibrated sieve size and not passing through the next smaller calibrated sieve (e.g., passing through a No. 35 sieve but not passing through a No. 40 sieve) are deemed to have a weight average size that is midway between those two neighboring sieve size openings (e.g., halfway between the approximate 500 micron and 425 micron openings for these two sieves, or about 463 microns). For a population of ground coffee particles in which their particle size distribution is approximately Gaussian, this method of determining and assigning a weight average is considered accurate.

The terms "truncated distribution of particle sizes" or "truncated particle size distribution" or simply "truncated size distribution" refers broadly to both a statistically restricted and physically restricted (i.e., size-limited) particle distribution measured for coffee particle sizes in a portion of ground (aka, "milled") coffee beans. In statistics, a "truncated distribution" is a conditional distribution with one or more domain or boundary limits that result from restricting the domain of a probability distribution, e.g., the upward or downward size limit of coffee particles. For example, grinding of coffee beans tends to produce a more or less Gaussian distribution of particle sizes that is reflected in a bell-shaped curve when the weight distribution (plotted on the y-axis) for the various sized particles is plotted against particle size on the x-axis. A "truncated Gaussian distribution" is obtained if large particles above a certain limit size ("upper size-limited"), or small particles below a certain size limit ("lower size-limited"), (or both the largest and smallest particles) are physically removed (e.g., by size-sieving). Truncated distributions arise in the real world and in practical statistics in cases where the ability to record, or even to know about occurrences is limited to values that lie above or below a given threshold or within a specified range. In the present technology, an "upper size-limited truncated Gaussian distribution" refers to a distribution of particle sizes in which a portion of a Gaussian distribution at the large particle size end of the distribution is removed.

The term "single serving amount" as used herein has two alternative meanings depending upon the context. The term can refer to the weight of ground coffee bean particles (or tea leaves etc), e.g., between about 5 g and about 15 g of ground coffee beans, placed in a filter cartridge for brewing a single serving of coffee beverage. Alternatively, the term refers to the volume or weight of water used in brewing a single serving of coffee beverage. In other words, the term "single serving" can refer to a selectable quantity of water or quantity of beverage that is brewed during one cycle of an automatic brewing machine that is designed and electronically programmed to dispense and propel a pre-measured quantity of heated water through a removable filtering cartridge (the cartridge being either disposable or refillable), in which the filtering cartridge typically contains a quantity of coffee grounds or tea leaves or other beverage-forming ingredient(s) sufficient for brewing a single serving of a beverage. Most automatic brewing machines are pre-programmed to dispense a number of different selectable volumes of heated water, e.g., 4 oz, 6 oz, 8 oz and 12 oz in which any or all of these programmed selectable volumes is considered a "single serving." Thus, this serving volume or weight can be highly variable, e.g., between about 4 oz and about 12 oz of heated water, depending upon the personal preferences of the coffee drinker. If a specific volume is not specified, a single serving of coffee is considered to be between about 6 and 8 fluid ounces. The term "single serving" can also used as an adjective-like term. Accordingly, it may be used to describe, modify or delimit the definition of another device such as "single serving filter cartridge" in which the filter cartridge is suitably sized for insertion and removal from a brewing machine designed for brewing single servings.

In accordance with the present technology, high quality coffee beans may be selected, and these beans may be carefully roasted and stored to protect against flavor degradation. Thus, in one embodiment, the composition includes roasted ground coffee bean particles.

Typical grinding equipment and methods for grinding roasted coffee beans are described, for example, in Sivetz & Foote, "Coffee Processing Technology", Avi Publishing Company, Westport, Conn., Vol. 1, pp. 239-250 (1963).

In one embodiment, ground coffee bean particles are separated on the basis of size to obtain the upper size-limited, truncated Gaussian distribution of particle sizes. In other words, the ground coffee bean particles having the upper size-limited, truncated Gaussian distribution of particle sizes of the present technology are fractionated coffee particles which are obtained by fractionating a heterogeneous and generally Gaussian distribution of particle sizes (produced during coffee bean grinding) to remove the uppermost range of particle sizes. Any suitable method of fractionating may be used including, but not limited to, size sieving (or screening) and air classifying. Air classifiers rely upon air drag and particle inertia, which depends upon particle size, to facilitate the separation of different sizes of particles.

In the present technology, the larger particles are removed from a heterogeneous population of particle sizes to enable the brewing of stronger coffee, gram for gram. In removing the larger particles, the peak particle size in the coffee particle population remains the same while only the upper end of the Gaussian distribution of particle sizes is truncated, i.e., removed. Thus, the particles remain sized for effective brewing with heated water at low pressure, as both the extraction of coffee constituents and flow rate is maximized.

In one embodiment of the present technology, the weight average particle size in the upper size-limited, truncated Gaussian distribution is between about 300 microns and about 550 microns. In another embodiment, the weight average particle size in the upper size-limited, truncated Gaussian distribution is between about 350 microns and about 550 microns. In yet another embodiment, the weight average particle size in the upper size-limited, truncated Gaussian distribution is between about 300 microns and about 450 microns. In certain other embodiments, the weight average particle size is between about 300 microns and about 350 microns, between about 300 microns and about 400 microns, between about 300 microns and about 425 microns, between about 300 microns and about 450 microns, between about 300 microns and about 500 microns, between about 350 microns and about 400 microns, between about 350 microns and about 425 microns, between about 350 microns and about 450 microns, between about 350 microns and about 500 microns, between about 350 microns and about 550 microns, between about 400 microns and about 450 microns, between about 400 microns and about 500 microns, or between about 400 microns and about 550 microns.

In an additional embodiment of the present technology, the composition includes less than about 10% by weight of particles larger than about 600 microns. In one particular embodiment, the weight average particle size in the upper size-limited, truncated distribution is also between about 350 microns and about 550 microns. In a further particular embodiment, the particle size is based on the particles retained on a U.S. Standard No. 30 sieve.

In another embodiment, the composition includes less than about 25% by weight of particles larger than about 600 microns.

In yet another embodiment, the composition includes less than about 20% by weight of particles larger than about 600 microns.

In a further embodiment, the composition includes less than about 15% by weight of particles larger than about 600 microns.

In one embodiment, the composition includes less than about 5% by weight of particles larger than about 600 microns.

In another embodiment, the composition includes less than about 25% by weight of particles larger than about 550 microns.

In yet another embodiment, the composition includes less than about 20% by weight of particles larger than about 550 microns.

In a further embodiment, the composition includes less than about 15% by weight of particles larger than about 550 microns.

In another embodiment, the composition includes less than about 10% by weight of particles larger than about 550 microns.

In yet another embodiment, the composition includes less than about 5% by weight of particles larger than about 550 microns.

In another embodiment, the composition includes less than about 25% by weight of particles larger than about 500 microns. In one particular embodiment, the weight average particle size in the upper size-limited, truncated Gaussian distribution is between about 300 microns and about 450 microns. In a further particular embodiment, the particle size is based on the particles retained on a U.S. Standard No. 35 sieve In a further embodiment, the composition includes less than about 20% by weight of particles larger than about 500 microns.

In yet another embodiment, the composition includes less than about 15% by weight of particles larger than about 500 microns.

In a further embodiment, the composition includes less than about 10% by weight of particles larger than about 500 microns.

In yet another embodiment, the composition includes less than about 5% by weight of particles larger than about 500 microns.

In another embodiment, the composition includes less than about 25% by weight of particles larger than about 450 microns.

In yet another embodiment, the composition includes less than about 20% by weight of particles larger than about 450 microns.

In a further embodiment, the composition includes less than about 15% by weight of particles larger than about 450 microns.

In another embodiment, the composition includes less than about 10% by weight of particles larger than about 450 microns.

In yet another embodiment, the composition includes less than about 5% by weight of particles larger than about 450 microns.

In another embodiment, the composition includes less than about 25% by weight of particles larger than about 400 microns.

In yet another embodiment, the composition includes less than about 20% by weight of particles larger than about 400 microns.

In a further embodiment, the composition includes less than about 15% by weight of particles larger than about 400 microns.

In another embodiment, the composition includes less than about 10% by weight of particles larger than about 400 microns.

In yet another embodiment, the composition includes less than about 5% by weight of particles larger than about 400 microns.

In a further embodiment, the particles have been separated on the basis of size using at least one particle sieve. At least one particle sieve prevents passage of particles larger than approximately 600 microns while allowing passage of particles smaller than 600 microns. At least another one particle sieve prevents passage of particles larger than approximately 500 microns while allowing passage of particles smaller than 500 microns.

In another embodiment, the composition includes ground coffee bean particles having a single upper size-limited, truncated Gaussian distribution of particle sizes.

In yet another embodiment, the composition includes ground coffee bean particles having two or more upper size-limited, truncated Gaussian distributions of particle sizes, wherein portions of the distributions are combined to form a blend of particle sizes.

The composition of the present technology can be provided as a single serving size or as a bulk package including multiple servings of coffee beverage.

This technology also relates to a filter cartridge assembly containing the ground and sized coffee bean particles of the present technology which have an upper size-limited, truncated Gaussian distribution of particle sizes. The filter cartridge assembly is configured for brewing in an automated coffee brewing machine.

In one embodiment, the filter cartridge assembly is sized to hold a single serving amount by weight of the coffee bean composition.

In one embodiment, a single serving of ground coffee bean particles may comprise between about 5 g and about 15 g, or between about 8 g and about 14 g, or between about 9 g and about 12 g of the coffee bean composition.

Filter cartridge assemblies (also known as coffee "filter pods" and "K-cups") are known in the art and are described, for example, in U.S. Pat. No. 5,325,765 to Sylvan et al., which is hereby incorporated by reference in its entirety. The term "filter cartridge" or "filter cartridge assembly" as used herein refers to both reusable and disposable cartridges. Most filter cartridge assemblies are fabricated as disposable brewing-filtering units that are used once and discarded, containing ground (aka, milled) coffee beans in a single use, single serving, sealed unit. The disposable filter cartridge typically includes an outer housing having a cover or lid, the housing and cover forming a chamber. The coffee is typically held by a strong and very porous water-permeable fabric-like material inside the outer housing. However, suitable filter cartridge assemblies also include refillable filter cartridges, which are refillable filter-baskets in a reclosable cartridge in which a durable filter holds and supports ground coffee in a chamber that is added to the basket shortly before brewing coffee. The filter can be fabricated from finely perforated metal or wire mesh. One example of a refillable filter cartridge assembly is the Solofill Cup™ (http://www.solofill.com, which is hereby incorporated by reference in its entirety) designed for use in Keurig® brewers (http://www.keurig.com, which is hereby incorporated by reference in its entirety). Typically, when the cover or lid of the coffee brewing machine is closed, a needle-like hollow water injector is automatically inserted into the cartridge and a gasket-like seal around the injector prevents water leakage and maintains water pressure in either the disposable or refillable filter cartridge during brewing.

This technology further relates to a method of brewing a coffee beverage. The method involves providing a filter cartridge assembly containing the coffee bean composition of the present technology, positioning the filter cartridge in a brewing machine, and brewing the coffee bean composition to produce a coffee beverage.

The term "brewing machine" refers to a coffee maker, especially a single serving coffee brewing machine that is designed, configured and arranged to hold the coffee filter cartridges described herein and to brew coffee. Such brewing machines may be programmed to brew a wide range of volumes of coffee, as well as brewing a wide variety of different beverages including hot coffee, hot teas, hot chocolate and other hot or cold beverages.

In the present technology, a filter cartridge containing size-separated and selected ground coffee bean particles is placed in a brewing machine and brewed, wherein brewing comprises passing heated water through a bed of the particles to produce a beverage.

In one embodiment, short duration, low pressure, hot water brewing is used. In particular, an automated coffee brewing machine is configured, arranged and programmed to provide short duration, low pressure, hot water brewing (also referred to herein as the "forced drip" method). In this embodiment, disposable or reusable single serving cartridges are placed in a low pressure automatic brewing machine and brewed with a premeasured amount of hot water that is heated to a temperature of approximately 192° F. Typical brewing machines are programmed to deliver between approximately 4 and 12 ounces of heated water that is typically forced downward through a filter cartridge under low pressure (0.1-0.5 bar) for a period of time sufficient to complete a programmed flow. Brewing time typically ranges from 10 seconds to two minutes, and more typically ranges from 25 seconds to a minute. To introduce heated water into and through the filter cartridge, a water injector, generally in the form of a sharp hollow tube or needle, passes through one wall of the cartridge and is generally configured and arranged with a concentric flexible gasket to form a sealing fit with the upper wall of the cartridge. With disposable filter cartridges, the cartridge's cover is typically formed from a strong laminated polymer-foil composite film that is heat-sealed in place and eventually penetrated by the water injector tube just before brewing the beverage. A second puncture can be made in the cartridge to allow the brewed beverage to exit the filter cartridge.

Several terms relate to physical parameters and/or conditions for brewing ground coffee bean particles as described herein using the so-called "forced drip" method. Brewing parameters may be directly or indirectly programmed into an automatic coffee brewing machine.

Thus, the term "short duration" for brewing coffee bean particles refers to a short time interval during which heated water under low pressure is propelled through a coffee filter cartridge described in the present disclosure. This time period is usually determined indirectly because water flow time depends upon the "cup size" selected by the user. That is, most coffee brewing machines allow the user to choose from a menu in which different volumes of heated water are sent by the machine's water pump to and through the filter cartridge. Delivery of larger cup sizes of heated water requires a longer flow and brewing time than smaller volumes. Notwithstanding these uncertainties and variables, and by way of example, "short duration" brewing of an 8 oz serving of coffee beverage (in which approximately 8 oz heated water is propelled through a coffee filter cartridge) typically requires between approximately 30 and 60 seconds and seldom requires more than 90 seconds. In one embodiment, "short duration" is less than two minutes. In another embodiment, "short duration" is less than one minute.

The term "low pressure" relates to the amount of pressure exerted on heated water being propelled through a filter cartridge for the purpose of brewing coffee or tea. In automatic forced drip brewing machines, water for brewing is typically pressurized to a low pressure ranging from approximately 0.1 to 0.5 bar (and typically not exceeding 1 bar, i.e., approximately 15 psi pressure). A low pressure can be generated by use of an integral air pump that is regulated by pressure sensors that prevent excessively high and low pressures.

The term "low pressure" in the context of pressure used to propel heated water through a bed of coffee particles in a coffee filter cartridge means that the pressure is at least about 0.1 bar or at least about 1.5 psi (pounds per square inch) of pressure but it is less than about 1 bar (about 15 psi). The pressure is also typically less than about 0.6 bar (approximately 7 psi pressure or less) such as 0.4 bar, 0.3 bar, 0.2 bar or 0.1 bar.

Ranges of low pressure can include from 0.1 bar to 0.6 bar, 0.1 bar to 0.3 bar, 0.1 bar to 0.4 bar, 0.2 bar to 0.4 bar, 0.2 bar to 0.5 bar, 0.3 bar to 0.5 bar, or 0.3 bar to 0.6 bar, for example.

In certain embodiments, in coffee brewing machines used to hold filter cartridges and pump heated water through the coffee particles described herein, water is typically pressurized to less than 0.5 bar (less than 7 psi or less than ½ atmosphere of pressure at sea level) where 1 bar=100 kiloPascals (100 kPa) pressure=750 mm mercury=1 atmosphere pressure. The propelling water pressure may range from 0.1 to 0.5 bar, 0.2 to 0.5 bar, 0.3 to 0.5 bar, or in some instances could be increased to a pressure of as much as between 0.5 and 1.0 bar. This minimally pressurized coffee brewing method may be descriptively termed "forced-drip" or "pressure-drip" and is distinguished from the well established high pressure coffee brewing methods such as the espresso brewing method that typically utilizes approximately 9-20 bar pressure to propel hot water through a bed of fine coffee grounds. Therefore, espresso brewing pressures are typically 20 to 50-fold greater than the forced drip pressures utilized in brewing either disposable or refillable coffee filter cartridges described in one embodiment of the present technology. The Keurig Corporation is a prominent manufacturer of multiple models of forced drip-type coffee machines that utilize so-called "K-cup" coffee filter cartridges. The improvement of ground coffees described herein for use in K-cups is equally applicable to coffees used in other filter cartridges placed in other forced drip automatic brewing machines. Numerous examples of other forced drip brewing machines are described, for example, at: http://www.popularmechanics.com/technology/gadgets/reviews/single-serve-coffee-maker-showd and http://kitchenboy.net/blog/single-serve-coffee-machine-primer/, which are hereby incorporated by reference in their entirety.

With a brewing process that may be best described as "forced drip," the brewing machine propels heated water under low pressure through a bed of coffee particles in the cartridge in a short period of time, e.g., approximately one minute or less. Given these constraints, in order to achieve efficient extraction of coffee bean constituents ("extractables") including flavor, color, caffeine and antioxidants, it has been determined that coffee particles within a filter cartridge should have a novel distribution of particle sizes. This distribution in the field of statistics is known as a "truncated Gaussian distribution" in which the upper end of the size distribution containing large particles is removed, i.e., truncated. If, for example, the largest ⅓ by weight of particles is removed and replaced with the same amount of smaller particles, a substantial increase in coffee beverage strength can be achieved. During typical filter cartridge brewing of coffee, it is shown herein that, gram for gram, the largest ⅓ of the coffee particles release as little as half the level of extractables released by smaller particles. Replacing this ⅓ portion of particles by smaller particles that release twice the level of extractables can increase the total yield of extractables in a coffee beverage by approximately ⅙.

For filter cartridges containing 12 g of coffee particles, this replacement allows approximately a 2 g reduction in coffee loading per cartridge without any significant decrease in coffee beverage strength.

In another embodiment, brewing a single serving amount by weight of the ground coffee bean particles having an upper size-limited, truncated Gaussian distribution of particle sizes releases a greater amount of coffee bean extractable substances than brewing the same amount by weight of a non-truncated (i.e., normal) Gaussian distribution of otherwise identical roasted ground coffee bean particles.

The term "extraction," or "efficient extraction" or "extractables" herein refers to the movement of diffusible and/or soluble substances from the interior and/or exterior of coffee bean particles during brewing the particles in an aqueous medium, e.g., in hot water at a coffee brewing temperature such as 192° F. These terms are meant to include cold water extraction as well as hot water extraction, although the latter is more common than the former. Brewing facilitates solubilization, emulsification, and other processes that liberate at least one water-soluble or water-dispersible substance contained within coffee bean particles, in which the substance migrates outward into the surrounding aqueous medium of a beverage. Such extracted agents or chemical components (aka, "extractables") from the roasted coffee bean include but are not limited to color agents, aroma agents, flavor components, caffeine, chlorogenic acid (CGA) antioxidants, lipids, amino acids, diterpenes, and trigonelline (vitamin B6 derivative).

Efficient extraction requires that greater than 50% and preferably between 75% and 100% of the total available extractable level of any specific agent (such as caffeine or CGA) be transferred from coffee bean particles to a surrounding aqueous medium.

The extractable substances are selected from the group consisting of color agents, aroma agents, flavor agents, caffeine, chlorogenic acid antioxidants, amino acids, diterpenes, trigonelline and combinations thereof. Color agents are produced by pyrolysis to carbon and miscellaneous browning products. Aroma agents are described, for example, at http://www.coffeeresearch.org/science/aromamain.htm, which is hereby incorporated by reference in its entirety. Such aroma agents include, but are not limited to, furans, pyrazines, thiazoles, pyrroles, thiophens, and thiazoles, such as (E)-β-Damascenone, 2-Furfurylthiol, 3-Mercapto-3-methylbutylformate, 3-Methyl-2-buten-1-thiol, 2-Isobutyl-3-methoxypyrazine, 5-Ethyl-4-hydroxy-2-methyl-3(2H)-furanone, Guaiacol, 2,3-Butanedione (diacetyl), 4-Vinylguaiacol, 2,3-Pentanedione, Methional, 2-Isopropyl-3-methoxypyrazine, Vanillin, 4-Hydroxy-2,5-dimethyl-3(2H)-furanone (Furaneol), 2-Ethyl-3,5-dimethylpyrazine, 2,3-Diethyl-5-methylpyrazine, 3-Hydroxy-4,5-dimethyl-2(5H)-furanone (Sotolon), 4-Ethylguaiacol, and 5-Ethyl-3-hydroxy-4-methyl-2(5H)-furanone (Abhexon). Aroma and flavor agents are also described, for example, in Ivon Flament, *Coffee Flavor Chemistry*, New York, Wiley (2002), which is hereby incorporated by reference in its entirety.

Thus, the present technology relates to compositions, systems, and methods for increasing the yield of extractable coffee bean constituents from roasted and ground coffee bean particles during the course of brewing these particles, particularly in coffee filter cartridges configured and sized for use in an automated brewing machine. Roasted coffee bean particles that are ground to particle sizes compatible with brewing in such machines have been packaged in filter cartridges and sold for a number of years.

The coffee particles in such cartridges have been analyzed and essentially Gaussian distributions (i.e., bell-shaped curves) of particle sizes have been found. When such distributions exhibit an appropriate weight average particle size, e.g., 500-600 microns, filter cartridges containing between approximately 5 g and 15 g of such roasted and ground coffee function adequately to hold and brew the coffee in such automated brewing machines. That is to say, heated water under a pressure of less than 1 atmosphere flows smoothly through the coffee grounds, and brewed coffee emerges from the cartridge during a brewing cycle that typically lasts between 30 seconds and a minute. In accordance with the present technology, the brewing process has been improved by, for example, increasing the yield of extractable coffee bean constituents by engineering the distribution of coffee particle sizes in the filter cartridge.

These aspects of the present technology are further illustrated by the examples below:

EXAMPLES

The following examples are provided to illustrate embodiments of the present technology, but they are by no means intended to limit its scope. All of the references cited in the Examples below are hereby incorporated by reference in their entirety.

Example 1

Sieve Analysis and Comparison of Coffee Particles in Different Commercial "Breakfast Blend" Single Serving Filter Cartridges Three commercial brands of coffee filter cartridges were purchased in boxes, each box containing 12 single use filter cartridges. Each cartridge contained between 9 g and 12 g of ground coffee. The coffees were produced or distributed by Green Mountain Coffee Roasters, Inc. (Waterbury, Vt.), Maxwell House/Kraft Foods Group, Inc. (Northfield, Ill.) and New England Coffee Company (Malden, Mass.). The three distinctly different tasting coffees labeled as 100% Arabica light roast coffees all carried the name "Breakfast Blend." Six filter cartridges of each coffee were opened by razor blade and the coffees collected to provide more than 50 g of each coffee. A 50.0 g sample of each coffee was sieve-fractionated for 15 minutes using a stack of calibrated U.S. Standard sieves on a tapping sieve shaker. In particular, a model SS-8R Tapping Sieve Shaker (Gilson Company, Inc. Lewis Center, Ohio) was used in conjunction with standard sieves to measure particle sizes. Sieves were obtained from the W. S. Tyler Industrial Group, Mentor, Ohio. Sieves were calibrated and conform to the current American Standard Testing Method ASTM E11-09 and ISO 565, 3310-1 standards. Eight inch diameter stainless steel cloth/stainless steel frame test sieves were utilized in all sieve tests. The amount of ground coffee sieved at any time was limited to 50 g to avoid overloading of sieves. Yield of ground coffee obtained on individual sieves in a stack of shaken sieves was determined by precision weighing of sieves before and then after 10, 15, and 20 minute intervals of sieve shaking. Fifteen minutes was generally sufficient sieving time (with shaking and tapping) to reach plateau weight values and thus complete the separation of coffee particles on stacked sieves ranging from a coarse U.S.

Standard No. 20 sieve (850 micron openings) downward to a fine U.S. Standard No. 120 sieve (125 micron openings) during the sieving-fractionation of 50 g quantities of ground coffee beans. Thus, sieve openings ranged from 850 microns (No. 20 sieve) as the uppermost sieve to approximately 125 microns as the lowermost sieve (No. 120 sieve). More specifically, the following Taylor sieves were used to fractionate commercially ground coffees and are listed by their U.S. Standard Numbers and their metric openings: No. 20, 850 microns; No. 25, 710 microns; No. 30, 600 microns; No. 35, 500 microns; No. 40, 425 microns; No. 45, 355 microns; No. 50, 300 microns; No. 60, 250 microns; No. 80, 180 microns; No. 120, 125 microns. All sieves were weighed to an accuracy of 10 mg both clean and empty before sieving and immediately after sieving with their captured portions of ground coffee. The weight difference (net weight) of coffee on each sieve was converted to a percentage of the total weight of coffee recovered on the sieves (50.0 g±0.25 g for all tests), then tabulated and graphically plotted to provide particle size distributions for each coffee. Weight average particle sizes were determined by arithmetic interpolation between two sieve size openings to reach 50% by weight particle retention (the smaller sieve opening) and 50% by weight particle passage (the larger sieve opening). Expressed another way, there are always two neighboring sieve sizes bracketing the interpolated weight average particle size at which 50% by weight of the particulate material is retained (on smaller sieve openings) and 50% by weight is passed (through larger sieve openings).

Figure 1:
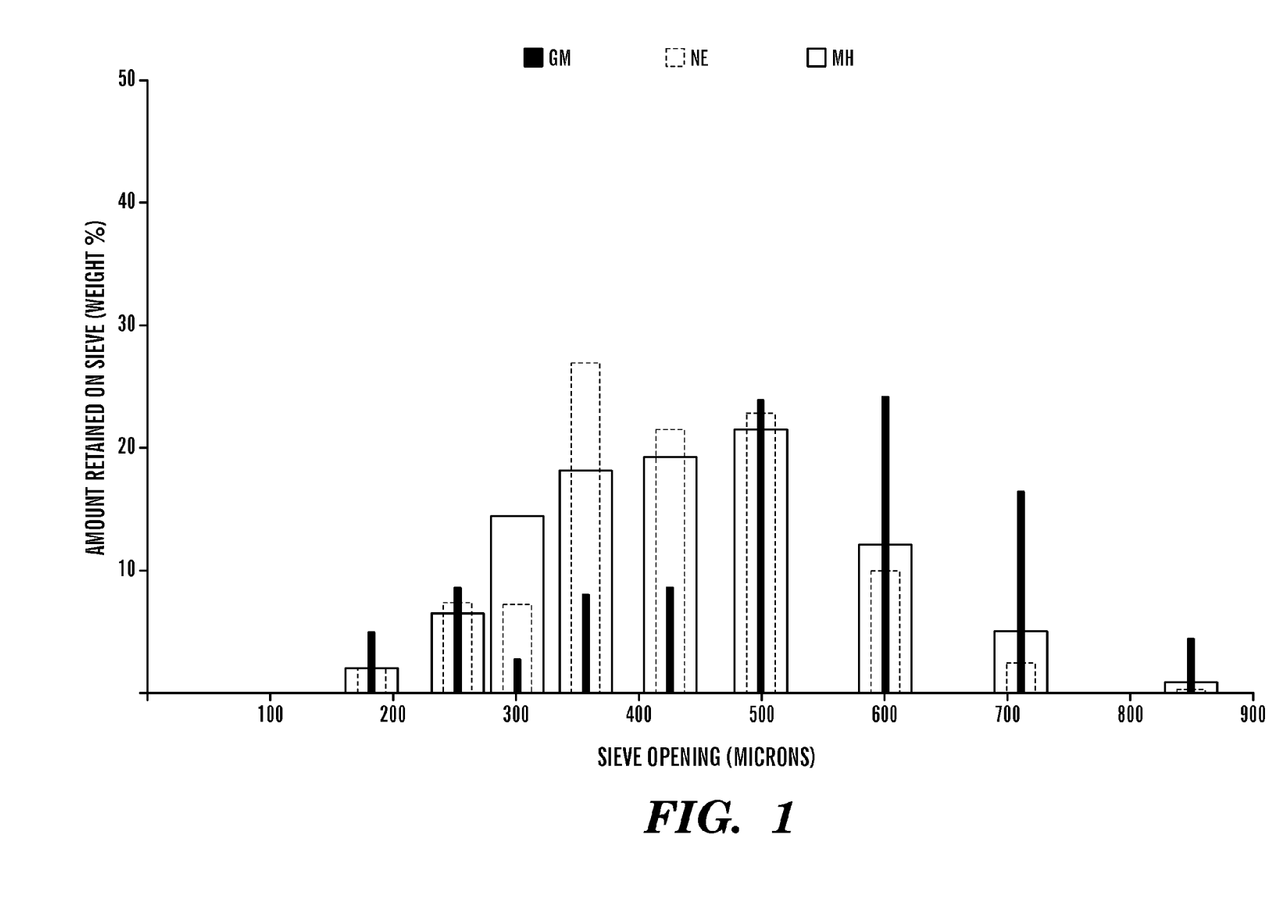
FIG. 1 shows particle distribution histograms for sieve-fractionated Breakfast Blends of Green Mountain (GM) (narrow bar), New England Coffee (NE) (medium bar), and Maxwell House (MH) (wide bar).

Particle size distributions for the Breakfast Blends of Green Mountain (GM), New England Coffee (NE), and Maxwell House (MH) that were sieve-fractionated as described are provided in Table 1, and corresponding particle distribution histograms for GM (narrow bar), NE (medium bar), and MH (wide bar) are provided in FIG. 1.

TABLE 1

Particle Size Distributions in Three Commercial Single Serving Coffee Filter Cartridges

| Sieve (U.S. Standard No.) | Mesh Opening (microns) | Weight Percent Coffee Retained on Sieve and running totals (in parentheses) | | |
|---|---|---|---|---|
| | | GM | NE | MH |
| 20 | 850 | 4.4 (4.4) | 0.0 (0.0) | 0.8 (0.8) |
| 25 | 710 | 16.1 (20.5) | 2.2 (2.2) | 5.1 (5.9) |
| 30 | 600 | 24.0 (44.5) | 10.0 (12.2) | 12.2 (18.1) |
| 35 | 500 | 23.8 (68.3) | 22.8 (35.0) | 21.5 (39.6) |
| 40 | 425 | 8.4 (76.7) | 21.6 (56.6) | 19.2 (58.8) |
| 45 | 355 | 7.8 (84.5) | 26.9 (83.5) | 18.1 (76.9) |
| 50 | 300 | 2.7 (87.2) | 7.2 (90.7) | 14.5 (91.4) |
| 60 | 250 | 8.7 (95.9) | 7.4 (98.1) | 6.5 (97.9) |
| 80 | 180 | 4.0 (99.9) | 2.0 (100) | 2.1 (100) |
| 120 | 125 | 0.1 (100) | 0.0 | 0.0 |

Weight average particle sizes for the Green Mountain, New England and Maxwell House coffees differed significantly, i.e., 565 microns, 461 microns, and 475 microns, respectively. While the shapes of the particle distributions are bell-shaped or "Gaussian," the relative peak heights and widths of the distribution curves, i.e., their standard deviations, differ considerably among the three coffees. For example, while the Maxwell House and New England coffees share a similar weight average particle size (approximately 460-475 microns), the New England coffee has a somewhat narrower particle size distribution (smaller standard deviation) and greater peak height than the Maxwell House coffee. Three sieves (Nos. 35, 40 and 45) captured the peak particle sizes (approximately two-thirds of the total coffee) for the New England product. Each sieve retained an average of 24% by weight of the total coffee. The same group of three sieves captured almost two-thirds of the Maxwell House coffee but each retained a somewhat smaller average amount of coffee, i.e., 19% by weight of the total. By contrast, a different group of three sieves with significantly larger mesh openings (Nos. 25, 30 and 35) captured approximately two-thirds of the considerably larger particle sizes of Green Mountain coffee, with each sieve retaining an average of 23% by weight of the total coffee. The sieve openings (in microns) and corresponding sieve numbers (25, 30, 35, etc) are provided in Table 1 and the preceding paragraph.

Viewing the entirety of coffee particles in FIG. 1, each of the three commercial blends forms a genereally Gaussian distribution of particle sizes. According to the present technology, as is further detailed herein, the largest particles in each distribution (for example, the largest 10%, 15%, 20%, 25%, 30%, 35% or even 40% by weight of coffee particles on the right hand end) can be removed by sieving or any functionally equivalent process for separating out the larger particles. In doing so, the Gaussian distribution of particle sizes is "truncated" (on its right side/large particle end) thus forming the "truncated Gaussian size distribution" of the present technology. The separated large particles can be re-ground to smaller particles for brewing by the low pressure (aka, "forced-drip") single serving coffee filter cartridge method described herein. Such smaller coffee bean particles, e.g., 300-500 micron particles, are brewed more rapidly, efficiently and therefore more effectively with the low pressure brewing method. That is, the smaller particles can more rapidly release desirable coffee bean constituents (e.g., caffeine, CGA, color and flavor) than particles that are substantially larger than 500 microns in the distributions shown in FIG. 1. From Table 1, the reduction in weight average coffee particle size caused by removing particles larger than 500 microns (passing each of these commercial cartridge coffees through a U.S. Standard No. 35 sieve) has been calculated. Results for weight average particle size reductions are as follows: GM coffee—565 microns was reduced to 350 microns; NE coffee—461 microns was reduced to 389 microns; MH coffee—475 microns was reduced to 381 microns.

Thus, a "target" for an improved weight average coffee particle size of between about 350 and 450 microns, or even between about 350 and 425 microns was achieved. It is significant that these weight average particle size reductions are large in light of the original commercial cartridge coffee particle sizes, e.g., reductions of about 100 microns or more, that are shown herein to produce a substantial increase in the level of coffee bean extractables found in a cup of coffee. At the same time, removing large coffee particles by sieving for example (thereby reducing the overall weight average particle size), does not generate the problematic filter-clogging smaller particles produced by grinding coffee beans more finely to reduce weight average particle size (illustrated in FIG. 2).

Example 2

Extraction of Coffee Color, Caffeine and Chlorogenic Acid Using Different Commercial Single Serving Filter Cartridges in Keurig Automatic Coffee Brewing Machine Single serving filter cartridges containing two different light-roasted "Breakfast Blend" 100% Arabica coffee bean blends produced by competing companies (Green Mountain and New England Coffee) were obtained. Particle size distributions were determined and are described above. Each filter cartridge was brewed two successive times (8 oz water per brewing cycle) in a Keurig automatic brewing machine for single serving coffee filter cartridges (model B70 Platinum Brewing System, Keurig Corporation, Reading, Mass.). The water brewing temperature was set at 192° F. Elapsed time between the beginning and end of visible water/coffee flow out of each filter cartridge was measured by stopwatch. For 8 oz water, the elapsed time varied between approximately 16 seconds (for free flow of 225-230 ml water without a coffee filter cartridge present in the machine) to approximately 50 seconds for the same amount of water flowing through a mixed bed of small and larger coffee particles. This time provided an indication of relative resistance to water flow through different filter cartridges. As discussed in detail infra, it was noted that the larger coffee particles, e.g., 500-700 microns, do not retard coffee flow through filter cartridges whereas smaller coffee particles, e.g., 350 microns and smaller, significantly retard coffee flow through and out of the filter cartridges. Very small coffee particles, e.g., 250 microns and smaller, tend to clog either the cartridge's filter or the coffee particle bed itself (or both), and either extend the brewing time or stop coffee flow altogether depending upon their abundance, i.e., the proportion of very small versus larger coffee particles.

It is interesting to note that an espresso coffee brewing machine operates with 190° F.±4° water (essentially the same temperature used in the present example) but is typically pressurized to a 20-50-fold higher level (e.g., 10-20 atm or bar pressure). An espresso machine is able to successfully brew approximately 7 g ground coffee whose average particle size is as small as 200 microns to produce one ounce of an intensely flavored and concentrated coffee beverage in approximately 25-30 seconds. Again, this pressure is many-fold greater than that used in the presently described process and is able to force water through a coffee bed composed of particles that are small enough to block water flow through the filter cartridges described and modified in the present disclosure.

After each brewing cycle for each filter cartridge, coffee was collected in a glass beaker, mixed (for homogeneity) and weighed. A 15 ml sample aliquot was transferred and saved in a screw cap-sealed polypropylene clinical centrifuge tube that was centrifuged at room temperature for three minutes with a relative centrifugal force of approximately 1000×G to eliminate large particulate material. Visible light spectrophotometry was used to measure coffee color extracted from the ground particles (absorption of light (optical density, i.e., OD) at 550 nm and 600 nm wavelengths for the undiluted coffee), while UV spectrophotometry of 200-fold aqueous dilutions of the same coffee samples allowed quantitation of the levels of extracted caffeine (274 nm wavelength peak) and extracted chlorogenic acids (aka, CGA antioxidants, at their 325 nm wavelength peak). The CGA antioxidants are natural phenolic antioxidants in green coffee beans with health benefits attributable to their ability to beneficially modulate glucose uptake in the GI tract and control the accompanying insulin increase in the bloodstream. CGA levels are reduced in roasted compared to green coffee beans owing to its oxidation during roasting.

Table 2 provides results comparing brewing of the "Breakfast Blend" coffee particles in filter cartridges produced by Green Mountain (GM) and New England Coffee Company (NE), and containing approximately 8.9 g and 11.8 g coffee grounds, respectively. With sample numbering, e.g., 1-1 and 1-2, the first number identifies the coffee filter cartridge sample while the second number (following the hyphen) indicates either the first or second brewing of that cartridge with 8 oz water at 192° F. Normalization numbers (in parentheses) allow comparison of the second with the first brewing.

TABLE 2

Spectrophotometric Measurement of Coffee Bean Extractables Following Brewing of Two Commercial Filter Cartridge Coffees

| Sample | Flow (sec) | Volume (ml) | Color (OD 550 nm) | Caffeine (OD 274 nm) | CGA (OD 325 nm) |
|---|---|---|---|---|---|
| Water only | 16 | 232 | — | — | — |
| GM 1-1 | 28 | 224 | 0.622 (1.00) | 0.381 (1.00) | 0.312 (1.00) |
| GM 1-2 | 27 | 230 | 0.294 (0.47) | 0.142 (0.37) | 0.129 (0.41) |
| GM 2-1 | 26 | 220 | 0.624 (1.00) | 0.374 (1.00) | 0.306 (1.00) |
| GM 2-2 | 27 | 228 | 0.292 (0.47) | 0.131 (0.35) | 0.118 (0.38) |
| NE 1-1 | 42 | 220 | 0.925 (1.00) | 0.613 (1.00) | 0.516 (1.00) |
| NE 1-2 | 30 | 230 | 0.371 (0.40) | 0.159 (0.26) | 0.149 (0.29) |
| NE 2-1 | 38 | 220 | 0.954 (1.00) | 0.567 (1.00) | 0.476 (1.00) |
| NE 2-2 | 29 | 228 | 0.375 (0.39) | 0.147 (0.26) | 0.140 (0.29) |

The flow times show that the first brewing cycle for NE cartridges is somewhat longer/slower (40 sec average) than the second (30 sec average). The 40 sec brewing time for the NE cartridges is also significantly longer than that for the GM cartridges (27 sec). The latter time interval is only 11 seconds longer than the water flow period (16 sec) for 8 oz water from the machine's water delivery system when no filter cartridge (and therefore no resistance to flow) is present in the machine. With the GM cartridges, water flows through its coffee particles just as quickly during the first as during the second brewing cycle. This observation suggests that the GM coffee particles with their considerably larger weight average size (565 microns), offer considerably less resistance to water flow than the smaller NE particles (461 microns weight average). Because particle mass and volume increase in proportion to the third power of diameter, the GM particles are approximately 2.1-fold greater in weight and therefore only about half as great in number as the NE particles in a given weight of ground coffee beans. Once the smaller NE coffee particles have been wetted during the initial (first) brewing cycle, water flow rate is observed to increase to approximately the same rate as for the GM particles (30 and 27 seconds respectively). With regard to intensity of beverage color (that tends to correlate with flavor), the NE cartridges deliver, during their initial brewing cycle (NE 1-1 and 2-1), an average of 1.52 times greater color (OD 550 nm)=0.94/0.62, than the GM cartridges. While the NE cartridges contain somewhat more coffee grounds than the GM cartridges (11.8 g vs. 8.9 g=1.3x), this 30% difference is insufficient alone to explain the 50% greater delivery of color. Furthermore, in Table 2 it is informative to compare the average caffeine levels (OD 274 nm) and CGA antioxidant levels (OD 325 nm) delivered in the first brewing of GM cartridges with those of the NE cartridges (i.e., caffeine=0.378 for GM vs. 0.590 for NE, and CGA=0.309 for GM vs. 0.496 for NE). By arithmetic calculation, the NE cartridges provide coffee beverage with a 56% greater caffeine level and a 61% greater CGA level than the GM cartridges. These 56% and 61% greater caffeine and antioxidant levels for NE cartridges substantially exceed the 30% greater loading of coffee grounds in the NE cartridges. It is believed that the smaller 461 micron average diameter NE coffee particles are better suited (sized) for extracting and delivering substantially greater coffee color, caffeine and CGA antioxidant than the larger 565 micron average diameter GM particles.

In Table 2, comparing the average delivery of residual color, caffeine and CGA during the follow-up (second) 8 oz brewing with the initial (first) 8 oz brewing for each filter cartridge, the NE cartridges retained a smaller proportion of extractables than the GM cartridges (color 40% vs. 47%, caffeine (26% vs. 36%) and CGA (29% vs. 40%). This suggests that the smaller average coffee particle size in the NE filter cartridges allows a significantly greater and fuller yield of hot water-extractable substances during a single 8 oz brewing of coffee beverage using a coffee filter cartridge in a single serve coffee filter cartridge brewing machine (e.g., the automatic Keurig-type filter cartridge brewing machines). With regard to the value of a second brewing of a coffee filter cartridge, it is recognized that few people brew the same coffee cartridge twice. However, the data provided herein from a second brewing cycle provide a strong indication of extraction efficacy in a disposable coffee filter cartridge during the single brewing cycle used by the typical consumer, and also the amount of valuable extractables remaining in the coffee grounds after that brewing.

Example 3

Altering Coffee Particle Size in Filter Cartridge Alters Beverage Extraction Efficiency Differences in extraction efficiency between GM and NE coffees in Table 2 were viewed in light of the differences in their average particle sizes in Table 1. From these comparisons, it was determined that controlling the distribution of coffee particle sizes contained in a single serving filter cartridge could be used to beneficially increase coffee beverage color, flavor, caffeine and CGA levels when brewed in a Keurig-type automatic coffee brewing machine.

Sixty grams of the NE Breakfast Blend coffee removed from single serving filter cartridges (weight average diameter=461 microns) was sieved on a U.S. Standard No. 35 sieve (500 micron openings) as described above. Approximately 39% by weight was retained on the sieve while 61% by weight of the particles (smaller than 500 microns) was passed through and collected in the pan beneath the No. 35 sieve. Duplicate weighed portions (10.00 g each) of three coffees (the unsieved coffee, the No. 35 sieve-passed coffee and the No. 35 sieve-retained coffee) were successively placed in a refillable filter cartridge basket. That basket, a Solofill Cup™ (http://www.solofill.com, which is hereby incorporated by reference in its entirety) is designed and sized to fit the Keurig brewer used herein and includes a porous mesh exterior that mimics the disposable filter cartridge. The coffees were brewed with 8 oz heated water (192° F.) using the same Keurig model B70 described above. Brewed coffees were collected, processed and analyzed by spectrophotometer as described above for the coffees in Table 2. With sample numbering, e.g., 1-1 and 1-2, the first number identifies a coffee sample loaded into the Solofill™ basket while the second number (following the hyphen) indicates either the first or second brewing of that coffee sample with 8 oz water at 192° F. The data are provided in Table 3 below.

TABLE 3

Spectrophotometric Measurement of Extractables Following Brewing of Unsieved and Size-Sieved Coffee Bean Particles from a Commercial Filter Cartridge

| Sample | Flow (sec) | Volume (ml) | Color (OD 550 nm) | Caffeine (OD 274 nm) | CGA (OD 325 nm) |
| --- | --- | --- | --- | --- | --- |
| Water only | 16 | 233 | — | — | — |
| Group A: Unsieved NE Breakfast Blend (NE-BB) | | | | | |
| NE 1-1 | 29 | 220 | 0.750 (1.00) | 0.518 (1.00) | 0.449 (1.00) |
| NE 1-2 | 30 | 229 | 0.304 (0.41) | 0.123 (0.24) | 0.126 (0.28) |
| NE-2-1 | 44 | 218 | 0.844 (1.00) | 0.562 (1.00) | 0.490 (1.00) |
| NE 2-2 | 38 | 232 | 0.270 (0.32) | 0.097 (0.17) | 0.098 (0.20) |
| Group B: NE-BB Retained on No. 35 Sieve | | | | | |
| NE 3-1 | 16 | 222 | 0.433 (1.00) | 0.341 (1.00) | 0.286 (1.00) |
| NE 3-2 | 17 | 228 | 0.280 (0.65) | 0.172 (0.50) | 0.162 (0.57) |
| NE 4-1 | 16 | 220 | 0.423 (1.00) | 0.343 (1.00) | 0.287 (1.00) |
| NE 4-2 | 17 | 229 | 0.268 (0.63) | 0.171 (0.50) | 0.162 (0.56) |
| Group C: NE-BB Passed by No. 35 Sieve | | | | | |
| NE 5-1 | 95 | 215 | 1.140 (1.00) | 0.650 (1.00) | 0.576 (1.00) |
| NE 5-2 | 55 | 233 | 0.248 (0.22) | 0.068 (0.10) | 0.065 (0.11) |
| NE 6-1 | 78 | 218 | 1.041 (1.00) | 0.616 (1.00) | 0.547 (1.00) |
| NE 6-2 | 51 | 232 | 0.247 (0.24) | 0.059 (0.10) | 0.059 (0.11) |

The results in Table 3 demonstrate that when NE Breakfast Blend coffee, initially brewed in its entirety before sieving (see Group A), is then sieve-fractionated into smaller (Group C) and larger (Group B) particle size portions that are separately brewed, the two portions yield stronger and weaker coffee beverages respectively. More specifically, coffee beverages (NE 5-1 and NE 6-1) that were brewed using 10.0 g of smaller coffee particles (having a weight average particle size of approximately 389 microns) were approximately twice as strong as coffee beverages (NE 3-1 and NE 4-1) brewed using 10.0 g of larger coffee particles (having a weight average particle size of approximately 594 microns). The smaller (389 microns) weight average was calculated for particles passed through a U.S. Standard No. 35 sieve, and weight averaging the particle yields on U.S. Standard No. 40, 45, 50, 60 and 80 sieves (see Table 1). The larger (594 microns) weight average was calculated for particles retained on a U.S. Standard No. 35 sieve and weight averaging the particle yields on U.S. Standard No. 25, 30 and 35 sieves. Coffee strength was judged based on color, caffeine and CGA concentrations (see Table 3). Comparing the concentrations of coffee extractables for sieved NE 5-1 and NE 6-1 particles with unsieved NE 1-1 and NE 2-1 particles, the beverages made from the sieved particles were as much as 35% higher for color and 20% higher for caffeine and CGA antioxidant. Furthermore, the residual caffeine and CGA extractables in the sieved NE-5-2 and NE 6-2 coffee particles measured during the second (i.e., repeat) 8oz brewing cycle amounted to only about 10% of those levels extracted during the first (initial) 8oz brewing (NE 5-1 and NE 6-1). By comparison, the unsieved coffee particles NE 1-1 and NE 2-1 released almost twice as much (about 20%) residual caffeine and CGA during the repeat 8oz brewing cycle. It is interesting to note that the flow time for 8 oz water through 10.0 g of the large sieved particles (Group B) is considerably shorter (17 sec) than through the same amount of unsieved (Group A) particles (30-40 sec). Conversely, the flow time through the smaller particles (Group C under 500 microns) is considerably longer for the initial brewing (78-95 sec).

An extended flow time of 50-90 sec with the Table 3 Group C samples above containing smaller sized coffee particles was also investigated. 11.8 g of the New England Coffee Company "Breakfast Blend" coffee was substituted with the same coffee where the coffee particles had been sieved through a No. 35 sieve as described earlier (thus particles were smaller than 500 microns) using a single edged razor blade to carefully open several sealed commercial disposable filter cartridges (New England Coffee Company). Fast setting epoxy resin was used to reseal the cartridges and after the resin had cured, three of such altered cartridges and three "control" unaltered Breakfast Blend cartridges were brewed with 8 oz water at 192° F. under standard conditions in the Keurig B70 coffee machine. Surprisingly, the water flow/brewing time for passage of 8 oz coffee was substantially shortened to a very acceptable time ranging between 35-45 sec for the three cartridges compared to the 78-95 sec measured initially (see above) using the refillable Solofill™ baskets. In fact, the water flow/brewing time for the three regular (unaltered, unsieved) NE Breakfast Blend cartridges was very similar, ranging between 29 and 42 sec. Thus, by using disposable commercial filter cartridges with their non-woven fabric filters, liquid flow rate through a bed of No. 35 sieve-passed coffee particles was essentially normal and suitable for commercial use. It is believed that the non-woven material provides greater filter surface area and higher permeability when compared to the refillable Solofill™ basket with its metal mesh filter. The yield of extractables from 11.8 g of the No. 35 sieved coffee particles brewed in the three resealed disposable cartridges (above) was compared with the extractables from the same amount of control unsieved coffee (the same NE Breakfast Blend coffee variety in three unaltered filter cartridges). The caffeine and CGA levels extracted from the sieved coffee averaged approximately 16% and 19% higher, respectively, and the color level 33% higher than those levels extracted from the same variety of unsieved coffee in the same disposable filter cartridges. It is believed that the favorable increase in the level of coffee extractables found using sieved coffee particles (≤500 microns) will be even greater when the filter cartridges are commercially produced (without resealing the cartridges with resin) because these repaired cartridges showed obvious leakage of liquid at the resin-resealed site during brewing.

Example 4

U.S. Standard No. 30 Sieved Coffee Particles (≤600 microns) Tested in Refillable Filter Cartridges Results presented in Table 4 below extend the experimental findings presented in Table 3. For purposes of comparing the underlying experiments, in Table 3, ground coffee was removed from filter cartridges (New England Coffee Company's Breakfast Blend) and sieved through a U.S. Standard No. 35 sieve (500 micron openings) while in Table 4, coffees marketed by four prominent companies were removed from K-cups and sieved through a U.S. Standard No. 30 sieve (600 micron openings). Other than altering the size of sieve openings (#30 sieve versus #35), the coffee brewing protocol and the analyses of brewed coffees by spectrophotometry were nearly identical. The only difference in the brewing protocol for Table 4 was that only one brewing cycle with 8 oz heated water was carried out for each 10.00 g quantity of unsieved or sieved coffee particles in the Keurig coffeemaker. As with the experiment for Table 3, a refillable Solofill™ cup brewing basket was used to hold the coffee grounds during brewing. The four commercial coffees featured by Group in Table 4 (all in K-cups distributed by Green Mountain Coffee Roasters, Inc., Waterbury, Vt.) are as follows:

Group A: Barista Prima Coffeehouse® Italian Roast
Group B: Caribou Coffee® Mahogany
Group C: Green Mountain Coffee Roasters® Dark Magic
Group D: Newman's Own® Organics—Newman's Special Blend All coffees were removed from sealed K-cup filter cartridges. Samples (10.00 g each) were weighed and brewed directly in the Solofill™ basket. In addition, 50 g quantities of the same ground coffees were removed from multiple K-cups and sieved on a calibrated U.S. Standard No. 30 sieve (mesh size opening=600 microns) before weighing out additional 10.00 g quantities of the coffee (passed through the sieve) for brewing. For these four K-cup packaged coffees, the percent by weight of the total coffee passed through this sieve (therefore ≤600 micron particles) are as follows: Group A=69.4%; Group B=55.3%; Group C=78.5%; Group D=78.3%.

These numbers can be compared with the data in Table 1 in which the weight percent of coffee particles passed through a No. 30 sieve is calculated by subtracting the weight percent retained numbers (in parentheses for sieve No. 30) from 100%. Accordingly, from Table 1 the weight percentage passing through the No. 30 sieve are: GM=55.5%; NE=87.8% and MH=81.9%. Interestingly, the 55.5% value for GM coffee in Table 1 (Green Mountain Breakfast Blend) is essentially the same value (55.3%) measured for the Group B coffee in Table 4 (Caribou Coffee® Mahogany). With both of these numbers being very close to 50% by weight (passing through the No. 30 sieve), both coffees are judged to have weight average particle sizes very close to 600 microns.

As in Table 3, coffee strength was judged based on extracted color (measured at a wavelength of either 550 nm or 600 nm), caffeine (274 nm), and CGA concentration (325 nm; See Table 3 for methods). Comparing the concentration of coffee extractables from the sieved particles versus unsieved particles, the sieved particles produced brewed coffees that were as much as 21% higher for color, and 20%-30% higher for caffeine and CGA antioxidants. Samples denoted with the number 1 in each Group were brewed from unsieved particles while samples denoted with the number 2 were brewed from sieved particles. Sample notations with the letters "a" and "b" (e.g., BPI-1a and BPI-1b) indicate duplicate samples. Normalization numbers (provided in parentheses) are provided for the purpose of easy comparison. These numbers are calculated after averaging the values for duplicate samples, and enable comparison of coffees brewed from sieved versus unsieved coffee particles. Values for unsieved coffee particles are assigned a value of 1.00 for purposes of comparison. It is interesting that with the first two coffees (Groups A and B), the flow times for 8 oz water brewing 10.00 g of the sieved coffee particles is considerably greater (2-3 fold) than for the unsieved particles. However, with the remaining coffees (Groups C and D), the flow times for sieved and unsieved coffee particles are not significantly different. It is possible that the Group A and B coffees contain higher levels of very small particles that participate in clogging of the mesh support in the Solofill™ brewing basket. As with Table 3 and given the data and results from Table 4, it is evident that sieving of a normal Gaussian distribution of coffee particles to produce a truncated distribution of particles can be valuable for significantly increasing the level of coffee extractables during the brewing of coffee as described herein. This brewing generally employs low pressure water as described above, and occurs in a period of time in which the flow of water through a filter cartridge does not exceed 2 minutes. One example of a coffee machine that can be used to carry out the presently described brewing process is the Keurig model B70 coffee brewing machine.

TABLE 4

Spectrophotometric Measurement of Coffee Bean Extractables Following Brewing of Unsieved (1a, 1b) and Size-Sieved (2a, 2b) Particles from Four Commercial Coffee Filter Cartridges.

| Sample | Flow (sec) | Volume (ml) | Color (OD 600 nm) | Caffeine (OD 274 nm) | CGA (OD 325 nm) |
|---|---|---|---|---|---|
| Water only | 16 | 226 | — | — | — |
| Group A* | | | | | |
| BPI-1a | 27 | 219 | 0.752 (1.00) | 0.730 (1.00) | 0.376 (1.00) |
| BPI-1b | 33 | 218 | 0.808 | 0.812 | 0.412 |
| BPI-2a | 67 | 218 | 0.933 | 0.945 | 0.478 |
|  |  |  | (1.21 av) | (1.25 av) | (1.24 av) |
| BPI-2b | 59 | 217 | 0.955 | 0.981 | 0.500 |
| Group B§ | | | | | |
| CCM-1a | 32 | 222 | 0.856 (1.00) | 0.754 (1.00) | 0.478 (1.00) |
| CCM-1b | 35 | 221 | 0.742 | 0.814 | 0.514 |
| CCM-2a | 98 | 211 | 0.981 | 1.069 | 0.695 |
|  |  |  | (1.21 av) | (1.34 av) | (1.37 av) |
| CCM-2b | 96 | 219 | 0.945 | 1.030 | 0.666 |
| Group CΔ | | | | | |
| GMD-1a | 22 | 223 | 0.874 (1.00) | 0.781 (1.00) | 0.412 (1.00) |
| GMD-1b | 22 | 221 | 0.956 | 0.795 | 0.491 |
| GMD-2a | 24 | 219 | 1.081 | 0.894 | 0.478 |
|  |  |  | (1.10 av) | (1.17 av) | (1.19 av) |
| GMD-2b | 26 | 220 | 0.942 | 0.948 | 0.593 |
| Group D† | | | | | |
| NOS-1a | 21 | 221 | 0.841 (1.00) | 0.808 (1.00) | 0.512 (1.00) |
| NOS-1b | 23 | 220 | 0.853 | 0.806 | 0.512 |
| NOS-2a | 25 | 218 | 0.922 | 0.891 | 0.566 |
|  |  |  | (1.11 av) | (1.17 av) | (1.18 av) |
| NOS-2b | 37 | 218 | 0.954 | 0.993 | 0.642 |

*Group A: Unsieved (1a, 1b) & #30 Sieved (2a, 2b) Barista Prima Coffeehouse ® Italian
§Group B: Unsieved (1a, 1b) & #30 Sieved (2a, 2b) Caribou Coffee ® Mahogany
ΔGroup C: Unsieved (1a, 1b) & #30 Sieved (2a, 2b) Green Mountain ® Dark Magic
†Group D: Unsieved (1a, 1b) & #30 Sieved (2a, 2b) Newman's Own ® Special Blend
Average values (in parentheses) are calculated for duplicate sieved samples that have been normalized to the average values for duplicate unsieved samples (assigned a value of 1.00 for comparison)

Example 5

Effect of Blending Different Particle Sizes of Ground Coffee on Water Flow During Filtration It is generally appreciated that milling coffee beans to a smaller average particle size will increase coffee particle surface area and allow faster and greater release of hot water-extractables from ground coffee beans. However, a surprising paradox emerges with the use of "forced drip" coffee filter cartridges and their use in automatic coffee brewing machines described herein. These machines operate at low water pressure (typically under 0.5 bar pressure) compared to espresso machines that operate at 9-18 bar pressure or approximately 20-40 times greater pressure. One problem with low pressure water is that small coffee particles retard the flow and passage of water through a coffee bed, and when the particles are sufficiently abundant in a particle mixture and small enough, will stop the flow of water altogether. More specifically and in greater detail, it has been found that the range of coffee particles that pass through a U.S. Standard No. 35 sieve and that are retained on a 45 mesh sieve (355-500 microns) do not retard water flow in the filter cartridges described herein. However, U.S. Standard No.

45 sieve-passed particles that are retained on a No. 60 sieve (250-355 microns) can substantially slow water flow through a 10.0 g coffee particle bed composed entirely of such particles. When their abundance is reduced from 10 g to 5 g by blending with 5 g of the larger 355-500 micron particles described above, then normal water flow and brewing in a filter cartridge according to the present disclosure is restored. Not surprisingly, when 10.0 g of a still finer mesh coffee was prepared and tested in a refillable Solofill™ filter basket, i.e., 180-250 micron particles (U.S. Standard No. 60 sieve-passed particles that were retained on a No. 80 sieve), no hot water passed through the coffee particle bed. For reference purposes, these small particles are similar in size to an espresso-type grind. Unlike the previous result, when the level of these very small particles was reduced by only one-half (i.e., from 10 g to 5 g by blending with another 5 g of the same larger 355-500 micron particles described above), normal brewing through the filter cartridge failed to be restored. Only by reducing the proportion of these very small 180-250 micron particles to approximately 20% by weight (2.0 g blended with 8 g of the same larger 355-500 micron particles) was normal brewing restored. Thus, when considering very small coffee particles such as 300 micron diameter particles and below, as the particles become even smaller (such as 200 microns), it is important to appreciate that even small proportions of fine particulate material (e.g., 10-20% by weight of 200 micron diameter coffee particles) can slow or block water flow through a bed of larger particles, e.g., ≥350 micron particles.

Clearly, U.S. Standard No. 60 sieve-passed coffee particles that are very small (250 microns and smaller) may cause water flow through a coffee filter cartridge of the present disclosure to be greatly retarded or even fully blocked. Therefore, milling bulk coffee beans to a weight average particle size that is too small (such as 300 microns and below) would be a mistake. A workable weight average particle size range as characterized herein should be 350-450 microns such as the coffee particle distributions measured with the NE and MH commercial filter cartridges after their coffees have been sieved through U.S. Standard No. 35 and 30 sieves with 500 and 600 micron openings. Conversely, however, it is counterproductive to use oversized coffee particles such as the 565 micron weight average particles found in GM Breakfast Blend cartridges (Table 1).

Large coffee particles allow accelerated passage of hot water. This can be a disadvantage because extractive diffusion of coffee components from such large particles into the passing hot water is slower than with small particles. Slower diffusion and slower extraction coupled with a shorter brewing time (owing to the rapid water flow through a bed of larger particles) reduces the strength of the resulting brew. This is evident in Table 2 where the strength of the NE coffee can be compared with the GM coffee. Flow time for the NE coffee filter cartridges (NE 1-1 and 2-1) averaged 40 seconds compared with 27 seconds for GM 1-1 and 2-1. With the many observations described herein, somewhat longer water flow times through coffee filter cartridges generally result in a superior and stronger cup of coffee compared to shorter flow times. Thus, for example, with the selection of an 8 oz brewing volume of water in a Keurig model B70 automatic coffee maker, a coffee filter cartridge that requires 40-50 seconds for completion of brewing rather than approximately 25 seconds generally provides a better tasting and stronger cup of coffee.

Example 6

Adjusting Water Flow Rate/Coffee Brew Time while Avoiding Clogging by Fine Particulate Coffee in Filter Cartridges The amount of time required for water and newly brewed coffee to emerge from the filter cartridges used in the present disclosure that enable brewing of ground and size-separated coffee particles described herein, depends upon a number of parameters. These include the volume of water selected in the coffee machine for brewing a serving of beverage, the magnitude of water pressure operating in the brewing machine, the amount of ground coffee placed in a coffee filter cartridge and, importantly, the sizes of coffee particles selected and their abundance as described herein. The latter parameters are at the core of the present technology. Significantly variable amounts of very small coffee particles (e.g., 250 microns and smaller) may be produced in the normal course of milling different varieties and different roasts of coffee beans (dark vs. medium vs. light roast). As described herein, these very small coffee particles (aka, "fines") tend to slow the flow of water through a filter cartridge (extending coffee brewing time). It has been found herein that with different varieties of commercially ground coffees packaged in disposable filter cartridges (e.g., K-cups), the brewing time for a selected volume of coffee (e.g., 8 oz) may vary significantly (e.g., from 20 to 40 sec). If such ground coffees are further sieved through a U.S. Standard No. 35 sieve (eliminating particles larger than 500 microns according to the present technology), the resulting rate of water flow and brewing time for these coffees in filter cartridges may be too slow using the coffee brewing machines described herein (employing only low pressure water for brewing).

As discussed herein, coffee particle sieving can be usefully adjusted or "tuned" in which a different threshold size of "large coffee particle" can be selected for elimination from coffee filter cartridges. Thus, the coffee particle size at which the Gaussian distribution is truncated can be adjusted, i.e., selected. This selection can be used to determine water flow rate and thereby coffee beverage brewing time using filter cartridges containing different varieties of ground coffee containing different amounts of flow rate-affecting "fines." For example, either a U.S. Standard No. 35 or a No. 30 sieve may be utilized to remove larger coffee particles. The remainder of smaller particles passing through the sieves (500 micron and 600 micron thresholds, respectively) is used for brewing coffee beverages. Brewing machine tests have shown that with coffee particles passed by a U.S. Standard No. 35, the loss of larger particles (>500 microns) may result in slowing of water flow though a filter cartridge. In some instances, brewing time for a 6-8 oz serving of coffee beverage may double from a normal interval of approximately 40 seconds to an extended interval of 80 seconds or more. If water flow and brewing time with a filter cartridge has become too slow and requires acceleration, the proportion of larger particles in the coffee cartridge can be increased to correct the problem. One means of achieving that objective is to combine and blend suitable proportions of two different truncated Gaussian distributions of coffee particle sizes in which the two distributions have different upper limits for particle size. For example, ground coffee bean particles that have been sieved through a U.S. No. 30 sieve have an upper size limit of 600 microns whereas the same ground particles sieved through a U.S. No. 35 sieve have an upper size limit of 500 microns. By adding an increasing amount of the former particles to the latter, the resulting blend contains a greater proportion of 500-600 micron-sized particles that have been found to increase the rate of water flow through a filter cartridge filled with sieved coffee particles. Thus, the above two preparations of sieved coffee particles can be empirically blended in different proportions to adjust water flow rate and thereby the coffee brewing time.

In summary, it is appreciated that the level of coffee bean extractables (including flavor components, caffeine and CGA antioxidants) can be beneficially increased by selecting and brewing smaller rather than larger coffee bean particles. However, it is also appreciated that an adequate rate of water flow through the filter cartridge requires a sufficient proportion of larger particles relative to smaller particles. These opposing factors can be balanced by making a variety of blends as suggested above for different truncated Gaussian distributions of coffee particle sizes.

Example 7

Coffee Particle Size Overview

As detailed herein, a novel approach has been taken to increase the level of total extractables in brewed coffee (including caffeine, CGA, color and flavors) produced using ground coffee particles packaged in single serving coffee cartridges. Rather than milling coffee more finely to increase extraction and produce greater beverage strength (shifting the particle distribution to a smaller average particle diameter), a weight average particle size established by milling is substantially maintained, but approximately 20%-60% by weight of the larger coffee particles are physically removed from the total particle population by sieving. Typically, approximately 20%-60% by weight of the total coffee is sieved away while approximately 40%-80% by weight of the coffee passes through the sieve for packaging in filter cartridges. The larger particles that are sieved away are fully re-utilized by re-milling them to smaller sized particles and re-sieving. A U.S. Standard No. 35 sieve with 500 micron openings appears to be a useful sieve size for this process. Coffee particles that are significantly larger than 500 microns, e.g., 600 microns and larger, are candidates for milling to a smaller particle size.

As herein described, a process is defined for removing the largest 20% to 40% by weight of coffee particles from a particle population based on using a standard sieving process. The process takes a substantially Gaussian distribution of coffee particles and utilizes a standard mechanical sieving process to achieve truncation of the particle size distribution that leaves one side of the distribution (with smaller particles) substantially intact. The resulting asymmetric, i.e., "truncated Gaussian distribution" of coffee particles that has been depleted of the larger coffee particles that are slower to release water-extractable components can provide certain advantages in low pressure (aka, 'forced drip") brewing of coffee particles packaged in single serving coffee filter cartridges.

Example 8

Brewing a Truncated Gaussian Distribution of Coffee Particle Sizes in Single Serving Coffee Cartridges It is widely appreciated that reducing the weight average size of coffee bean particles by milling the coffee beans more finely may accelerate the release of extractable coffee bean components into heated water during brewing. Accordingly, espresso brewing utilizes very finely ground coffee (e.g., 200 micron particles) where only 20-25 seconds are typically available for extracting constituents from the coffee particles. By comparison, coarsely ground coffee beans (e.g., 1.0-1.3 mm particles) can be used effectively with so-called French press brewing that allows the coffee grounds to be exposed to hot water for a substantial period of time, e.g., 4-6 minutes, rather than 20 seconds. There are still other brewing methods including drip and percolator brewing where coffee particles are exposed to heated water for an intermediate period of time, e.g., 2-3 minutes, and medium sized coffee particles are most suitable. With drip brewing, only the force of gravity is available to move hot water through a bed of coffee grounds. Finely ground coffee (e.g., 200-300 micron particles) is contraindicated for drip coffee makers because these particles easily retard or block the flow of water through the bed of coffee particles.

Traditionally, coffee bean milling and resulting coffee particle sizes have been adjusted to match a particular coffee brewing method. In the present disclosure, a single serving coffee filter cartridge containing approximately 10-12 g of ground coffee particles is placed in an automatic coffee brewing machine (e.g., a Keurig-type machine) and exposed to a forced flow of heated water (e.g., 192° F.) under low pressure. The heated water extracts a variety of coffee bean components during the water flow/brewing time that may vary between approximately 30 and 60 seconds. This time period is longer than traditional espresso brewing (20 sec) but considerably shorter than drip, percolator and many other brewing methods. It has been shown herein that for a given amount of ground coffee placed in a filter cartridge (see data in Table 3), coffee particles that are larger than approximately 500 microns and held back on a U.S. Standard No. 35 sieve, release only half the level of desired coffee extractables that are released by coffee particles that pass through the same sieve. Therefore, removing coffee particles larger than a certain threshold size from ground coffee destined for packaging in filter cartridges provides a ground coffee that releases higher levels of desired extractables. With a number of commercial filter cartridge coffees that have been tested, a wide range, i.e., between approximately ⅓ and ⅔ by weight, of the ground coffee consists of such larger particles (≥500 microns). These particles are only half as productive as smaller particles in releasing desired extractables (e.g., color/flavor, caffeine and CGA). Therefore, replacing even ⅓ of the coffee with 2-fold superior material should yield a ground coffee that when brewed will provide at least ⅙ more (almost 20% more) coffee extractables. Consistent with this calculation, the data in Table 3 show that 10.0 g of Group C brewed coffee grounds (U.S. Standard No. 35 sieved grounds) yielded a 20% stronger coffee than that brewed using the same amount of unsieved coffee grounds (Group A). This conclusion is based on measured and then calculated average levels of color, caffeine and CGA extracted from grounds placed in Solofill™ basket-type refillable filter cartridges. If coffee bean cost factors and reduction of ground coffee content in these filter cartridges are important, then using a 20% more potent ground coffee product that has been sieved through, for example a U.S. Standard No. 35 sieve may allow substantial cost savings.

For any coffee brewing machine that accommodates single serving coffee filter cartridges, it may be desirable to increase coffee beverage flavor intensity, caffeine content and/or CGA antioxidant level in a cup of coffee. The level of these components can be increased by increasing the amount of ground coffee packaged into each filter cartridge or alternatively improving the efficiency of extracting these components from a given amount of ground coffee particles. As described above, milling coffee beans to a smaller particle size is undesirable because that typically results in clogging of the cartridge's filter material, retarded filtration and extended brewing time. Instead, the present technology utilizes a conventional ground coffee that has been ground, for example, to an approximate 400-500 micron particle size (weight average). Conventionally ground coffees will typically exhibit an approximate Gaussian (bell-shaped curve) distribution of coffee particle sizes, as coffee grinding results in random particle fragmentation. In accordance with the present technology, such coffee is then sieved to remove a substantial portion of the larger particles in the distribution. The remaining coffee particles provide what is described herein as a truncated Gaussian distribution of particle sizes. This is illustrated in FIG. 2 in which the shaded portion of the distribution curve represents coffee particles larger than 500 microns that have been removed from the balance of the coffee by sieving. This particular curve was generated from a sieving analysis of Maxwell House "Breakfast Blend" coffee recovered from their single serving coffee filter cartridges (see Table 1). Coffee particles larger than 500 microns that have been shown to brew poorly in filter cartridges (based upon their release of 50% lower levels of extractables including caffeine, CG and color than the balance of smaller coffee particles) can be re-ground to smaller particles and included in filter cartridges. Approximately 10% to 40% and more typically 20-30% of the total coffee can be removed by sieving away particles whose size exceeds a selected threshold target size, e.g., 500 microns or greater. For comparison, the dashed line curve in FIG. 2 represents a theoretical Gaussian distribution having a similar width and size heterogeneity to the test curve, where the distribution would be similarly substantially free of particles larger than 500 microns. In contrast to the presently disclosed truncated Gaussian distribution of particle sizes, this theoretical curve reaches a peak particle size near 250 microns. Such coffee particles would be nearly as fine as an espresso grind. Such small coffee particles consistently fail to brew in filter cartridges as described herein because 250 microns (and smaller) particles block water flow during brewing with low pressure heated water. Therefore, a strategy of grinding coffee beans to a small enough average particle size, e.g., 250 microns, to eliminate particles larger than 500 microns is not a viable strategy. However, with the presently developed sieving strategy, after sieving away coffee particles larger than 500 microns (e.g., see Maxwell House Breakfast Blend in FIG. 2 initially having a weight average particle size of 475 microns), the resulting "truncated Gaussian coffee" has a substantially larger weight average particle size than 250 microns, i.e., 380 microns. This coffee brews successfully in filter cartridges of the present technology using a Keurig model B70 coffee machine operating with low pressure water (approximately 0.5 bar as described by Duffy et al. in U.S. Pat. No. 6,672,200).

It is informative to attempt brewing a range of smaller particle size coffees in single serving filter cartridges. For example, using a U.S. Standard No. 45 sieve, the coffee particles passing through this sieve (all smaller than 355 microns) have been harvested from the NE and MH 'Breakfast Blend" filter cartridge coffees. These particles represent only approximately 20% by weight of these coffees (see Table 1). Upon brewing 10 g of these particles with 8 oz heated water in a Keurig B70 coffee machine, the flow of water rapidly ceased and the filters clogged. Therefore, the idea of milling coffee to a significantly smaller weight average particle size to improve extraction of coffee in filter cartridges is believed to be unworkable. Instead, as described herein, continuing to mill coffee beans to a workable weight average particle size (e.g., approximately 400-550 microns), and introducing a sieving step to remove the more slowly extractable larger particles in the Gaussian distribution of particle sizes, given that large particles release coffee bean extractables too slowly, has been shown to be beneficially productive during short duration filter cartridge brewing. Thus, for example, particles larger than 500 microns are removed by sieving with a U.S. Standard No. 35 sieve, or particles larger than 600 microns are removed by sieving with a U.S. Standard No. 30 sieve.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A coffee bean composition comprising ground and sized coffee bean particles comprising an upper size-limited, truncated Gaussian distribution of particle sizes, wherein the composition comprises less than about 10% by weight of particles larger than about 600 microns and wherein the weight average particle size in the upper size-limited, truncated Gaussian distribution is between about 350 microns and about 550 microns and wherein the largest 20% to 40% by weight of coffee particles have been removed to produce the upper size-limited, truncated Gaussian distribution of particle sizes.

2. The composition of claim 1, wherein the weight average particle size in the upper size-limited, truncated Gaussian distribution is between about 350 microns and about 450 microns.

3. A coffee bean composition comprising ground and sized coffee bean particles comprising an upper size-limited, truncated Gaussian distribution of particle sizes, wherein the composition comprises less than about 25% by weight of particles larger than about 500 microns and wherein the weight average particle size in the upper size-limited, truncated Gaussian distribution is between about 300 microns and about 450 microns and wherein the largest 20% to 40% by weight of coffee particles have been removed to produce the upper size-limited, truncated Gaussian distribution of particle sizes.

4. The composition of claim 3, wherein the composition comprises less than about 15% by weight of particles larger than about 500 microns.

5. The composition of claim 3, wherein the composition comprises less than about 5% by weight of particles larger than about 500 microns.

6. The composition of claim 3, wherein the weight average particle size in the upper size-limited, truncated Gaussian distribution is between about 350 microns and about 450 microns.

7. The composition of claim 3, wherein the composition comprises less than about 20% by weight of particles smaller than about 250 microns.

8. The composition of claim 3, wherein the particles have been brewed using heated water brewing at a pressure of about 0.1 bar to less than about 1 bar and a duration of less than about two minutes.

9. The composition of claim 3, wherein the particles have been separated on the basis of size using at least one particle sieve.

10. The composition of claim 3, wherein the composition comprises ground coffee bean particles having a single upper size-limited, truncated Gaussian distribution of particle sizes.

11. The composition of claim 3, wherein the composition comprises ground coffee bean particles having two or more upper size-limited, truncated Gaussian distributions of particle sizes, wherein portions of the distributions are combined to form a blend of particle sizes.

12. A filter cartridge assembly containing the coffee bean composition of claim 1.

13. The assembly of claim 12, wherein the filter cartridge is sized to hold a single serving amount by weight of the coffee bean composition.

14. A filter cartridge assembly containing the coffee bean composition of claim 3.

15. The assembly of claim 14, wherein the filter cartridge is sized to hold a single serving amount by weight of the coffee bean composition.

16. A method of brewing a coffee beverage comprising:
providing a filter cartridge assembly containing the coffee bean composition of claim 1;
positioning the filter cartridge assembly in a brewing machine; and
brewing the coffee bean composition to produce a coffee beverage.

17. The method of claim 16, wherein brewing comprises:
heated water brewing at a pressure of about 0.1 bar to less than about 1 bar and a duration of less than about two minutes.

18. The method of claim 16 wherein the coffee beverage comprises a greater amount of coffee bean extractable substances than a coffee beverage brewed from the same amount by weight of a non-truncated Gaussian distribution of the ground coffee bean particles.

19. The method of claim 18, wherein the extractable substances are selected from the group consisting of color agents, aroma agents, flavor agents, caffeine, chlorogenic acid antioxidants, amino acids, diterpenes, trigonelline and combinations thereof.

20. The method of claim 18, wherein the ground coffee bean particles are separated on the basis of size by sieving to obtain the upper size-limited, truncated Gaussian distribution of particle sizes.

21. The method of claim 16, wherein the removed coffee particles are re-ground to a smaller size and added back to the ground coffee bean particles.

22. A method of brewing a coffee beverage comprising:
providing a filter cartridge assembly containing the coffee bean composition of claim 3;
positioning the filter cartridge assembly in a brewing machine; and
brewing the coffee bean composition to produce a coffee beverage.

23. The method of claim 22, wherein brewing comprises:
heated water brewing at a pressure of about 0.1 bar to less than about 1 bar and a duration of less than about two minutes.

24. The method of claim 22, wherein the coffee beverage comprises a greater amount of coffee bean extractable substances than a coffee beverage brewed from the same amount by weight of a non-truncated Gaussian distribution of the ground coffee bean particles.

25. The method of claim 24, wherein the extractable substances are selected from the group consisting of color agents, aroma agents, flavor agents, caffeine, chlorogenic acid antioxidants, amino acids, diterpenes, trigonelline and combinations thereof.

26. The method of claim 22, wherein the ground coffee bean particles are separated on the basis of size by sieving to obtain the upper size-limited, truncated Gaussian distribution of particle sizes.

27. The method of claim 22, wherein the removed coffee particles are re-ground to a smaller size and added back to the ground coffee bean particles.

28. A coffee bean composition comprising ground and sized coffee bean particles comprising an upper size-limited, truncated Gaussian distribution of particle sizes, wherein only an upper end of the distribution of particle sizes is truncated and wherein the composition comprises less than about 10% by weight of particles larger than about 600 microns and wherein the weight average particle size in the upper size-limited, truncated Gaussian distribution is between about 350 microns and about 550 microns.

29. A coffee brewing system comprising a filter cartridge assembly configured to fit in a forced drip brewing machine that provides heated water at a pressure ranging from at least about 0.1 bar to less than about 1 bar, wherein said filter cartridge assembly contains a coffee bean composition comprising ground and sized coffee bean particles comprising an upper size-limited, truncated Gaussian distribution of particle sizes, wherein the composition comprises less than about 10% by weight of particles larger than about 600 microns and wherein the weight average particle size in the upper size-limited, truncated Gaussian distribution is between about 350 microns and about 550 microns.

30. A coffee brewing system comprising a filter cartridge assembly configured to fit in a forced drip brewing machine that provides heated water at a pressure ranging from at least about 0.1 bar to less than about 1 bar, wherein said filter cartridge assembly contains a coffee bean composition comprising ground and sized coffee bean particles comprising an upper size-limited, truncated Gaussian distribution of particle sizes, wherein the composition comprises less than about 25% by weight of particles larger than about 500 microns and wherein the weight average particle size in the upper size-limited, truncated Gaussian distribution is between about 300 microns and about 450 microns.

* * * * *